United States Patent [19]

Inoue

[11] Patent Number: 5,378,734

[45] Date of Patent: Jan. 3, 1995

[54] UV AND MOISTURE-CURABLE ORGANOPOLYSILOXANE COMPOSITIONS, CURED PRODUCTS THEROF, AND METHOD FOR MAKING

[75] Inventor: Yoshio Inoue, Annaka, Japan

[73] Assignee: Shin-Etsu Chemical Company, Ltd., Tokyo, Japan

[21] Appl. No.: 112,457

[22] Filed: Aug. 27, 1993

[30] Foreign Application Priority Data

Sep. 7, 1992 [JP] Japan .................... 4-264194

[51] Int. Cl.$^6$ .................... C08F 2/50; C08G 77/18; C08G 77/20

[52] U.S. Cl. .................... 522/11; 522/12; 522/39; 522/40; 522/43; 522/44; 522/45; 522/46; 522/68; 522/99; 522/17; 522/83; 528/32; 526/302; 526/279

[58] Field of Search ............... 522/99, 11, 12, 39, 522/40, 43, 44, 45, 46, 68, 83; 528/26, 28, 32, 34, 35, 17; 526/279, 302

[56] References Cited

U.S. PATENT DOCUMENTS

| | | | |
|---|---|---|---|
| 4,064,027 | 12/1977 | Gant et al. | 260/46.5 |
| 4,267,297 | 5/1981 | Hanada et al. | 528/34 |
| 4,579,636 | 4/1986 | Inoue et al. | 522/99 |
| 4,675,346 | 6/1987 | Lin et al. | 522/39 |
| 5,091,483 | 2/1992 | Mazurek et al. | 528/26 |
| 5,246,979 | 9/1993 | Lutz et al. | 522/99 |

*Primary Examiner*—Susan W. Berman
*Attorney, Agent, or Firm*—Birch, Stewart, Kolasch & Birch

[57] ABSTRACT

A UV and moisture-curable organopolysiloxane composition comprising (i) an organopolysiloxane terminated with a radical of formula (1):

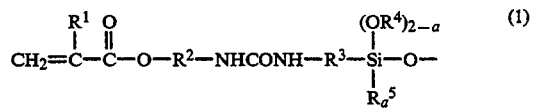

wherein $R^1$ is a hydrogen atom or monovalent hydrocarbon radical, each of $R^2$ and $R^3$ is a divalent hydrocarbon radical which may contain a NH bond or ether bond, each of $R^4$ and $R^5$ is a monovalent hydrocarbon radical which may contain an ether bond, and a is equal to 0 or 1, (ii) a photo-polymerization initiator, and (iii) a curing catalyst. The composition readily cures either upon exposure to UV radiation or upon contact with moisture and from the surface to the deep interior within a short time, yielding cured products having satisfactory physical properties.

19 Claims, No Drawings

UV AND MOISTURE-CURABLE ORGANOPOLYSILOXANE COMPOSITIONS, CURED PRODUCTS THEROF, AND METHOD FOR MAKING

BACKGROUND OF THE INVENTION

1. Field of the Invention

This invention relates to organopolysiloxane compositions which cure upon exposure to ultraviolet radiation or upon contact with moisture into silicone rubber products having improved physical properties and are thus useful as adhesives, sealants, coating agents, potting agents and the like. It also relates to cured products of the compositions and a method for preparing the compositions.

2. Prior Art

Most prior art moisture-curable compositions are of one-part type and cure upon contact with moisture in the air by simply extruding from containers such as tubes and cartridges. Because of such ease of application and no attack on electric and electronic parts, they are universally used in the electric, electronic and building fields.

However, since the moisture-curable organopolysiloxane compositions cure upon contact with moisture in the air, it takes a long time for curing to proceed from the surface to the deep interior when the compositions are extruded in the air from the tubes or cartridges. Because of slow curing to the deep interior, the moisture-curable organopolysiloxane compositions would be rather deleterious to the speedup of the part production line when used for bonding, sealing or coating of electronic parts. There is a need for improvement in this regard.

Also, ultraviolet (UV) radiation-curable organopolysiloxane compositions are well known in the art. Japanese Patent Publication (JP-B) No. 40334/1977 or U.S. Pat. No. 4,064,027 and Japanese Patent Application Kokai (JP-A) No. 104158/1985 disclose mixtures of a vinyl-containing organopolysiloxane and a mercapto-containing organopolysiloxane which undergo photo-addition for curing upon exposure to UV. These compositions have satisfactory curing capabilities, but suffer from the problems of disgusting odor and metal corrosion due to the use of mercapto-containing organopolysiloxane. Their application to electric and electronic parts is thus not recommended.

It is also proposed in JP-B 36515/1978 and JP-A 215009/1985 or U.S. Pat. No. 4,675,346 to incorporate sensitizing agents with acryl-containing organopolysiloxane such that the resultant compositions are UV curable. These compositions, however, are less curable especially at the surface. Only resinous compositions having increased acryl contents provide smooth curing. There remains a problem of UV curing capability.

There is a desire to have a curable organopolysiloxane composition which is easy to apply and can quickly cure from the surface to the deep interior.

SUMMARY OF THE INVENTION

An object of the present invention is to provide a UV and moisture-curable organopolysiloxane composition which is easy to apply, has improved curing capability both at the surface and deep interior and cures into a product having satisfactory physical properties. Another object is to provide such a cured product and a method for preparing the composition.

We have found that by blending an organopolysiloxane terminated with a radical of the general formula (1) defined below with a photo-polymerization initiator and a curing catalyst, there is obtained an organopolysiloxane composition which is curable with either UV or moisture. This UV and moisture-curable organopolysiloxane composition cures within a short time upon exposure to UV radiation and exhibits improved curing capability both at the surface and deep interior as well as improved curing capability in those portions not exposed to UV. Therefore, if the composition is subject to both curing upon UV exposure and curing upon contact with moisture, those portions exposed to UV can cure in accordance with the UV curing procedure and the remaining portions which cannot be directly exposed to UV can cure in accordance with the moisture curing procedure. The composition cures into a product having improved physical properties. In addition, the composition eliminates the problems of odor and corrosion and is easy to apply. Therefore, the composition can be widely used in the fields of building, construction, electric and electronic part manufacture as various sealants, coating agents and adhesives.

The organopolysiloxane used herein is terminated with a radical of the general formula (1):

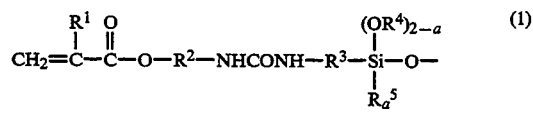

wherein $R^1$ is a hydrogen atom or a substituted or unsubstituted monovalent hydrocarbon radical, each of $R^2$ and $R^3$ is a substituted or unsubstituted divalent hydrocarbon radical which may contain a NH bond or ether bond, each of $R^4$ and $R^5$ is a substituted or unsubstituted monovalent hydrocarbon radical which may contain an ether bond, and letter a is equal to 0 or 1.

We have also found that the organopolysiloxane terminated with a radical of formula (1) can be advantageously obtained by mixing for reaction (A) an organopolysiloxane terminated with a silanol radical with (B) an aminoalkylalkoxysilane of the general formula (2) defined below such that the molar ratio of alkoxy radical in component (B) to silanol radical in component (A) may be at least 1, thereby forming an intermediate organopolysiloxane terminated with an aminoalkyl radical of the general formula (3) defined below and a hydrolyzable alkoxy radical, and mixing for reaction the intermediate organopolysiloxane with (C) a compound of the general formula (4) defined below such that the molar ratio of amino radical in the intermediate organopolysiloxane to NCO radical in component (C) may be at least 0.9. By adding a photo-polymerization initiator and a curing catalyst to the resulting organopolysiloxane, a UV and moisture-curable organopolysiloxane composition as defined above can be produced in an industrially advantageous manner.

Aminoalkylalkoxysilane (B) is of the general formula (2):

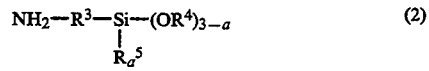

wherein $R^3$ is a substituted or unsubstituted divalent hydrocarbon radical which may contain a NH bond or ether bond, each of $R^4$ and $R^5$ is a substituted or unsubstituted monovalent hydrocarbon radical which may contain an ether bond, and letter a is equal to 0 or 1.

The aminoalkyl radical with which the intermediate organopolysiloxane is terminated is of the general formula (3):

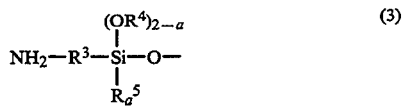
(3)

wherein $R^3$, $R^4$, $R^5$, and a are as defined above.

Compound (C) is of the general formula (4):

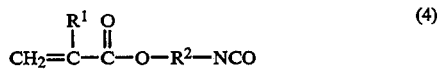
(4)

wherein $R^1$ is a hydrogen atom or a substituted or unsubstituted monovalent hydrocarbon radical, and $R^2$ is a substituted or unsubstituted divalent hydrocarbon radical which may contain a NH bond or ether bond.

Briefly stated, the present invention provides a UV and moisture-curable organopolysiloxane composition comprising (i) an organopolysiloxane terminated with a radical of formula (1), (ii) a photo-polymerization initiator, and (iii) a curing catalyst. Also provided is a cured product obtained by curing the composition. Further provided is a method for preparing a UV and moisture-curable organopolysiloxane composition comprising the steps of: mixing for reaction (A) an organopolysiloxane terminated with a silanol radical with (B) an aminoalkylalkoxysilane of formula (2) such that the molar ratio of alkoxy radical in component (B) to silanol radical in component (A) may be at least 1, thereby forming an organopolysiloxane terminated with an aminoalkyl radical of formula (3) and a hydrolyzable alkoxy radical; mixing for reaction the organopolysiloxane with (C) a compound of formula (4) such that the molar ratio of amino radical in the radical of formula (3) to NCO radical in component (C) may be at least 0.9, thereby forming an organopolysiloxane terminated with a radical of formula (1); and mixing the last-mentioned organopolysiloxane with a photo-polymerization initiator and a curing catalyst.

DETAILED DESCRIPTION OF THE INVENTION

A first essential component of the UV and moisture-curable organopolysiloxane composition according to the present invention is an organopolysiloxane having a radical of formula (1) at an end of its molecular chain.

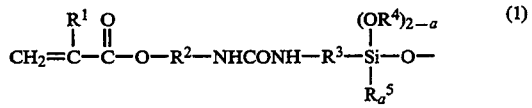
(1)

In formula (1), $R^1$ is a hydrogen atom or a substituted or unsubstituted monovalent hydrocarbon radical, each of $R^2$ and $R^3$ is a substituted or unsubstituted divalent hydrocarbon radical which may contain a NH bond or ether bond, each of $R^4$ and $R^5$ is a substituted or unsubstituted monovalent hydrocarbon radical which may contain an ether bond, and letter a is equal to 0 or 1.

Preferably, $R^1$ is a hydrogen atom or a methyl radical. $R^2$ is selected from alkylene radicals having 1 to 8 carbon atoms, for example, methylene, ethylene and propylene radicals. $R^3$ is selected from $C_1-C_8$ alkylene radicals and $C_1-C_8$ alkylene radicals containing a NH bond or ether bond. $R^4$ and $R^5$ are independently selected from alkyl and alkoxy radicals having 1 to 4 carbon atoms, for example, methyl, ethyl, and propyl radicals and methoxyethyl radical.

The organopolysiloxane terminated with a radical of formula (1) can be synthesized by mixing for reaction (A) an organopolysiloxane terminated with a silanol radical with (B) an aminoalkylalkoxysilane of formula (2) in a specific proportion, thereby forming an intermediate organopolysiloxane terminated with an aminoalkyl radical of formula (3) and a hydrolyzable alkoxy radical, and mixing for reaction the intermediate organopolysiloxane with (C) a compound of formula (4) in a specific proportion.

The starting organopolysiloxane terminated with a silanol radical as component (A) preferably has the following general formula (5).

(5)

In formula (5), each of $R^6$ and $R^7$ is a substituted or unsubstituted monovalent hydrocarbon radical having 1 to 8 carbon atoms, for example, lower alkyl radicals such as methyl, ethyl and propyl radicals, alkenyl radicals such as vinyl and allyl radicals, aryl radicals such as phenyl and tolyl radicals, cyclohexyl radical, and substituted ones of these radicals in which some or all of the hydrogen atoms attached to the carbon atoms are replaced by halogen atoms, cyano radicals or the like. $R^6$ and $R^7$ may be identical or different. Letter m is an integer of at least 5, preferably 10 to 1,000. Since the organopolysiloxane of formula (5) preferably has a viscosity of 25 to 500,000 centistokes (cs) at 25° C., more preferably 1,000 to 100,000 cs at 25° C., it is desired to control the value of m such that the viscosity may fall within the range.

Component (B) to be reacted with the silanol-terminated organopolysiloxane is an aminoalkylalkoxysilane of the following general formula (2):

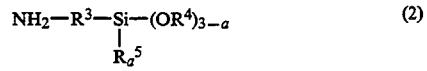
(2)

wherein $R^3$, $R^4$, $R^5$, and a are as defined above. Examples of the aminoalkylalkoxysilane are given below wherein Me represents methyl. $NH_2CH_2Si(OMe)_3$, $NH_2C_3H_6Si(OMe)_3$, $NH_2C_2H_4NHC_3H_6Si(OMe)_3$, $NH_2C_2H_4NHCH_2C_6H_4Si(OMe)_3$, $NH_2C_2H_4OC_3H_6Si(OMe)_3$, $NH_2CH_2SiMe(OMe)_3$, $NH_2C_3H_6SiMe(OMe)_2$, $NH_2C_2H_4NHC_3H_6SiMe(OMe)_2$, $NH_2C_2H_4NHCH_2C_6H_4SiMe(OMe)_2$, $NH_2C_2H_4OC_3H_6SiMe(OMe)_2$ Also included are those compounds obtained by replacing the alkoxy radical of the foregoing compounds by another alkoxy radical such as ethoxy and methylcellosolve radicals.

Reaction between organopolysiloxane (A) and aminoalkylalkoxysilane (B) is desirably carried out by mixing them such that the molar ratio of alkoxy radical in component (B) to silanol radical in component (A) may be at least 1, preferably from 1.5 to 10, more preferably from 2 to 4. If the molar ratio is less than 1, there can be formed intermediate organopolysiloxanes which have increased viscosity or are gel. The reaction conditions are not critical although it is preferred to continue reaction for about 1 to 10 hours while heating at 80° to 150° C.

When organopolysiloxane (A) reacts with aminoalkylalkoxysilane (B), alcohol-removing reaction takes place to yield an intermediate organopolysiloxane terminated with a hydrolyzable alkoxy radical and an aminoalkyl radical of the following general formula (3):

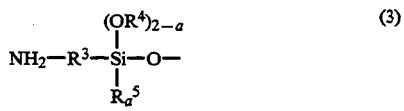

wherein $R^3$, $R^4$, $R^5$, and a are as defined above.

Therefore, the intermediate organopolysiloxane has the following formula:

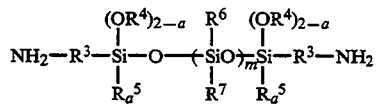

wherein $R^3$, $R^4$, $R^5$, $R^6$, $R^7$, a and m are as defined above.

Next, the intermediate organopolysiloxane terminated with an aminoalkyl radical of formula (3) and a hydrolyzable alkoxy radical is mixed for reaction with a compound of the following general formula (4):

$$\begin{matrix} R^1 & O \\ | & \| \\ CH_2=C-C-O-R^2-NCO \end{matrix} \quad (4)$$

wherein $R^1$ and $R^2$ are as defined above, thereby yielding an organopolysiloxane terminated with a radical of formula (1).

The thus obtained organopolysiloxane has the following formula:

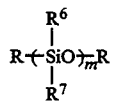

in which R represents

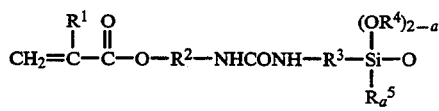

$R^1$ to $R^7$, a and m are as defined above

Examples of the compound of formula (4) include acrylic and methacrylic compounds containing an isocyanato radical, such as

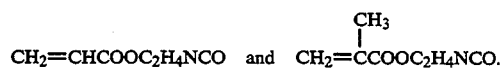

For reaction, the intermediate organopolysiloxane terminated with an aminoalkyl radical of formula (3) and a hydrolyzable alkoxy radical is mixed with component (C) or compound of formula (4) such that the molar ratio of amino radical in the intermediate organopolysiloxane to NCO radical in component (C) may be at least 0.9, preferably from 0.95 to 1.05. With a molar ratio of less than 0.9, some aminoalkyl radicals remain unreacted which would adversely affect stability. The reaction conditions may be adequately controlled although it is desirable to carry out the reaction for about 1 to 3 hours at room temperature, that is, without heating.

If necessary, the above-mentioned series of reactions may be carried out in the presence of an organic solvent, for example, toluene, xylene, benzene, hexane, and cyclohexane.

A second essential component of the inventive composition is a photo-polymerization initiator which is required to promote polymerization reaction of the organopolysiloxane as the first component taking place upon exposure to UV radiation. Examples of the photo-polymerization initiator include acetophenone, propiophenone, benzophenone, xanthol, benzaldehyde, 4-methylacetophenone, 3-pentylacetophenone, 4-methoxyacetophenone, 3-bromoacetophenone, 4-allylacetophenone, 3-methoxybenzophenone, p-chlorobenzophenone, 4-dimethoxybenzophenone, 4-chloro-4-benzylbenzophenone, 3-chloroxanthol, benzoin, benzoin methyl ether, benzoin butyl ether, bis(4-dimethylaminophenyl)-ketone, benzylmethoxyketal, diethylacetophenone, 2,2-dimethoxy-2-phenylacetophenone, and diethoxyacetophenone.

Preferably the photo-polymerization initiator is blended in an amount of about 0.01 to 5 parts by weight per 100 parts by weight of the organopolysiloxane as the first component. Less than 0.01 part of the initiator on this basis would be ineffective for its purpose whereas more than 5 parts of the initiator provide no further advantages and are disadvantageous in economy.

A third essential component of the inventive composition is a curing catalyst which is required to allow the composition to cure with moisture. Examples of the catalyst include tin carboxylates such as tin naphthenate, tin caprylate, and tin oleate; tin compounds such as dibutyltin diacetate, dibutyltin dioctotate, dibutyltin dilaurate, dibutyltin dioleate, diphenyltin diacetate, dibutyltin oxide, dibutyltin dimethoxide, dibutylbis(triethoxysiloxy)tin, and dibutyltin benzylmaleate; and titanate esters and titanium chelates such as tetraethoxytitanium, tetraisopropoxytitanium, tetra-n-butoxytitanium, tetrakis(2-ethylhexosy)titanium, dipropoxybis(acetylacetonato)titanium, and titanium isopropoxyoctylene glycol.

The amount of the catalyst blended is not critical although the catalyst is preferably blended in an amount of up to about 5 parts by weight, more preferably about 0.5 to 3 parts by weight per 100 parts by weight of the organopolysiloxane as the first component. More than 5 parts of the catalyst would adversely affect the shelf stability of the composition or detract from the cured properties.

In the practice of the invention, a basic compound may be used in combination with the catalyst in order to enhance catalytic activity. Examples of the basic compound include amines such as octylamine and laurylamine; cyclic amidines such as imidazoline, tetrahydropyrimidine, and 1,8-diazabicyclo(5.4.0)undecene-7 (DBU); super strong bases such as guanidine; and guanidyl-containing silanes such as tetramethylguanidylpropyltrimethoxysilane, tetramethylguanidylpropyldimethoxysilane, and tetramethylguanidylpropyltris(-trimethylsiloxy)silane, partially hydrolyzed products thereof and guanidyl-containing siloxanes. The basic compound may be added in an amount of 0 to 3 parts by weight, preferably about 0.1 to 3 parts by weight on the same basis as above.

In order to increase the storage stability of the composition in a sealed state, the inventive composition may further contain a silane containing two or more hydrolyzable radicals in a molecule or a partially hydrolyzed product thereof. Examples of the silane include methyltrimethoxysilane, methyltri(methylethylketoxime)silane, methyltripropenyloxysilane, methyltriacetoxysilane, methyltri-n-butylaminosilane and substituted ones of these silanes in which the methyl radical is replaced by a vinyl, phenyl, trifluoropropyl or similar radical, as well as tetramethoxysilane, tetraethoxysilane, tetrabutoxysilane and partially hydrolyzed products thereof. These silanes or partially hydrolyzed products thereof may be used alone or in admixture of two or more and are preferably blended in an amount of 0 to 20 parts, preferably about 1 to 20 parts, more preferably about 3 to 10 parts by weight per 100 parts by weight of the organopolysiloxane as the first component.

If necessary, the inventive composition may further contain a filler for the purposes of increasing cured rubber strength, extension and imparting thixotropy. Examples of the filler include silica fine powders such as fumed silica, fired silica, precipitated silica, ground silica, and fused silica powder; diatomaceous earth; metal oxides such as iron oxide, zinc oxide, titanium oxide, barium oxide, and magnesium oxide; metal carbonates such as calcium carbonate, magnesium carbonate, and zinc carbonate; metal hydroxides such as cerium hydroxide and aluminum hydroxide; glass fibers, glass wool, carbon black, finely divided mica, asbestos, spherical silica, and spherical silsesquioxane powder, while these fillers may be surface treated with silanes to be hydrophobic. The amount of the filler blended, which varies with a particular type of filler, is generally in the range of 0 to 500 parts by weight, preferably about 5 to 500 parts by weight per 100 parts by weight of the organopolysiloxane as the first component.

In addition to the above-mentioned components, any of conventional additives commonly used in this type of composition can be optionally blended in the inventive composition insofar as the objects of the invention are not impaired. Exemplary of such additives are thixotropic agents such as polyethylene glycol and derivatives thereof, pigments, dyes, anti-aging agents, antioxidants, antistatic agents, flame retardants such as antimony oxide and chlorinated paraffin, heat transfer modifiers such as boron nitride and aluminum oxide, tackifiers such as organic silicon compounds having reactive organic radicals such as amino, epoxy and mercapto radicals, and silane coupling agents.

The organopolysiloxane composition of the invention may be diluted with suitable solvents such as hydrocarbon solvents (e.g., toluene, xylene and petroleum ether), ketones and esters for convenience of application to substrates. Moreover any of plasticizers, anti-sagging agents, anti-staining agents, preservatives, bactericides and fungicides may be blended without a problem.

The composition of the invention may be prepared as a UV and moisture-curable organopolysiloxane composition of the one part type by synthesizing the organopolysiloxane terminated with a radical of formula (1) according to the above-described process, and uniformly mixing it with selected ones of the above-mentioned components including photo-polymerization initiator and curing catalyst in a dry atmosphere. Alternatively, a UV and moisture-curable organopolysiloxane composition of the two part type is available by packaging the organopolysiloxane terminated with a radical of formula (1) and other selected components as one part and the photo-polymerization initiator, curing agent and other selected components as another part such that they are combined together on use.

The UV and moisture-curable organopolysiloxane composition of the present invention, when brought into contact with air, cures through crosslinking reaction provoked by moisture in the air and when exposed to UV radiation, cures through crosslinking reaction provoked by UV radiation. In either case, the composition cures into rubber products having superior properties. Especially the composition of the invention can undergo both curing by UV exposure and curing by moisture contact at the same time. It is then possible, for example, that during curing by UV exposure, those portions which cannot be directly exposed to UV radiation be cured with moisture. It is to be noted that the conditions under which cross-linking reaction can be provoked by moisture are not critical although preferred conditions include a temperature of about 10° to 35° C. and a time of about 1 to 24 hours. UV exposure may be done by simply operating a conventional UV lamp for several seconds to several minutes while curing similarly takes place under sunlight.

The UV and moisture-curable organopolysiloxane composition of the present invention readily cures either upon exposure to UV radiation or upon contact with moisture and from the surface to the deep interior within a short time, yielding a cured product having superior physical properties. Therefore the composition finds a wide variety of applications as sealing agents and coating agents in the building and construction industries and as adhesives, sealants and potting agents for electric and electronic parts.

EXAMPLE

Examples of the present invention are given below by way of illustration and not by way of limitation. All parts are by weight and the viscosity was measured in centistokes (cs) at 25° C.

Synthesis 1

A 300-ml flask was charged with 100 grams of a dimethylpolysiloxane terminated with a silanol radical at either end having a viscosity of 700 cs (silanol content 0.015 mol/100 g) and 3 grams of γ-aminopropyltrimethoxysilane. While passing nitrogen gas, the flask was heated at 120° C. to effect methanol-removing reaction for 3 hours. Then 2.6 grams of methacryloxyethyl isocyanate was added to the reaction mixture, which was allowed to react for 30 minutes at room temperature. The resulting polymer was a clear liquid having a viscosity of 950 cs. On analysis by liquid chromatography and IR spectroscopy, it was identified to be a dimethylpolysiloxane terminated with the following radical at either end of its molecular chain.

Synthesis 2

A 300-ml flask was charged with 100 grams of a dimethylpolysiloxane terminated with a silanol radical at either end having a viscosity of 1,500 cs (silanol content 0.010 mol/100 g) and 3 grams of γ-aminopropyltrimethoxysilane. While passing nitrogen gas, the flask was heated at 120° C. to effect methanol-removing reaction for 3 hours. Then 1.6 grams of methacryloxyethyl isocyanate was added to the reaction mixture, which was allowed to react for 30 minutes at room temperature. The resulting polymer was a clear liquid having a viscosity of 1,750 cs. On analysis by liquid chromatography and IR spectroscopy, it was identified to be a dimethylpolysiloxane terminated with the following radical at either end of its molecular chain.

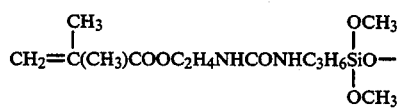

Examples 1 and 2

Using the polymers of Synthesis Examples 1 and 2, curable organopolysiloxane compositions were prepared in accordance with the formulation of Table 1.

The compositions were cured by UV exposure or at room temperature by the procedures shown below. The cured products were measured for physical properties. The results are also shown in Table 1.

UV Curing

Each composition was extruded into a sheet of 2 mm thick, which was passed three times through a UV irradiation apparatus ASE-20 (manufactured by Nippon Battery K. K.) at a speed of 1 m/min. Then the sheet was allowed to stand for 30 minutes before it was measured for physical properties according to JIS K-6301.

Room Temperature Curing

Each composition was extruded into a sheet of 2 mm thick, which was allowed to stand for 7 days in air at a temperature of 20° C. and a humidity of 55% while light was shielded so as to avoid UV exposure. It was measured for physical properties according to JIS K-6301.

TABLE 1

| Composition (pbw) | Example 1 | Example 2 |
|---|---|---|
| Polymer of Synthesis 1 | 100 | — |
| Polymer of Synthesis 2 | — | 100 |
| Hydrophobic silica (specific surface area 120 m²/g) | 10 | 10 |
| Diethoxyacetophenone | 2 | 2 |
| Methyltrimethoxysilane | 3 | 3 |
| Dibutyltin dilaurate | 0.2 | 0.2 |
| γ - tetramethylguanidyl - propyltrimethoxysilane | 0.5 | 0.5 |

TABLE 1-continued

| Physical properties | UV | RTV | UV | RTV |
|---|---|---|---|---|
| Hardness (JIS A scale) | 35 | 30 | 30 | 31 |
| Elongation (%) | 120 | 130 | 200 | 210 |
| Tensile strength (kg/cm²) | 18 | 20 | 15 | 17 |

As seen from Table 1, the organopolysiloxane compositions of the invention can readily cure upon exposure to UV radiation and upon contact with moisture at room temperature, yielding cured products having equally satisfactory rubber physical properties in both the cases.

Although some preferred embodiments have been described, many modifications and variations may be made thereto in the light of the above teachings. It is therefore to be understood that within the scope of the appended claims, the invention may be practiced otherwise than as specifically described.

I claim:

1. A UV and moisture-curable organopolysiloxane composition comprising
   (i) an organopolysiloxane terminated with a radical of the formula (1):

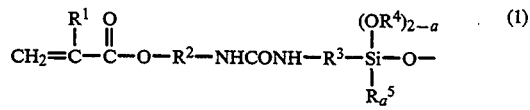

wherein $R^1$ is a hydrogen atom or a substituted or unsubstituted monovalent hydrocarbon radical, each of $R^2$ and $R^3$ is a substituted or unsubstituted divalent hydrocarbon radical which may contain a NH bond or ether bond, each of $R^4$ and $R^5$ is a substituted or unsubstituted monovalent hydrocarbon radical which may contain an ether bond, and letter a is equal to 0 or 1,
   (ii) a photo-polymerizable initiator, and
   (iii) a curing catalyst.

2. A cured product obtained by curing the UV and moisture-curable organopolysiloxane composition of claim 1.

3. The UV and moisture-curable organopolysiloxane composition according to claim 1, wherein $R^1$ is a hydrogen atom or a methyl radical.

4. The UV and moisture-curable organopolysiloxane composition according to claim 1, wherein $R^2$ is an alkylene radical having 1 to 8 carbon atoms.

5. The UV and moisture-curable organopolysiloxane composition according to claim 1, wherein $R^3$ is a $C_1$–$C_8$ alkylene radical that may contain an NH or ether bond.

6. The UV and moisture-curable organopolysiloxane composition according to claim 1, wherein $R^4$ and $R^5$ are independently alkyl radicals having 1 to 4 carbon atoms or alkoxy radicals having 1 to 4 carbon atoms.

7. The UV and moisture-curable organopolysiloxane composition according to claim 1, wherein said photopolymerization initiator is selected from the group consisting of acetophenone, propiophenone, benzophenone, xanthol, benzaldehyde, 4-methylacetophenone, 3-pentyl-acetophenone, 4-methoxyacetophenone, 3-bromo-acetophenone, 4-allylacetophenone, 3-methoxybenzophenone, p-chlorobenzophenone, 4-dimethoxybenzophenone, 4-chloro-4-benzylbenzophenone, 3-chloroxanthol, benzoin, benzoin methyl ether, benzoin butyl ether, bis(4-dimethylaminophenyl)-ketone, benzylmethoxyketal, diethylacetophenone, 2,2-dimethoxy-2-phenylacetophenone, and diethoxyacetophenone.

8. The UV and moisture-curable organopolysiloxane composition according to claim 1, wherein the content of said photo-polymerization initiator is 0.01 to 5 parts by weight per 100 parts by weight of said organopolysiloxane of formula (1).

9. The UV and moisture-curable organopolysiloxane composition according to claim 1, wherein said curing catalyst allows said composition to cure with moisture.

10. The UV and moisture-curable organopolysiloxane composition according to claim 9, wherein said curing catalyst is selected from the group consisting of tin naphthenate, tin caprylate, tin oleate, dibutyltin diacetate, dibutyltin dioctotate, dibutyltin dilaurate, dibutyltin dioleate, diphenyltin diacetate, dibutyltin oxide, dibutyltin dimethoxide, dibutylbis(triethoxysiloxy)tin, dibutyltin benzylmaleate, tetraethoxytitanium, tetraisopropoxytitanium, tetra-n-butoxytitanium, tetrakis(2-ethyl-hexosy)titanium, dipropoxybis(acetylacetonato)titanium, and titanium isopropoxyoctylene glycol.

11. The UV and moisture-curable organopolysiloxane composition according to claim 1, wherein the content of said curing catalyst is from 0.5 to 3 parts by weight per 100 parts by weight of said organopolysiloxane of formula (1).

12. A method for preparing a UV and moisture-curable organopolysiloxane composition comprising the steps of:

reacting (A) an organopolysiloxane terminated with a silanol radical with (B) an aminoalkylalkoxysilane of the formula (2):

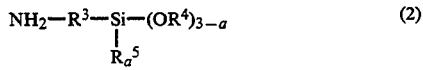

wherein $R^3$ is a substituted or unsubstituted divalent hydrocarbon radical which may contain a NH bond or ether bond, each of $R^4$ and $R^5$ is a substituted or unsubstituted monovalent hydrocarbon radical which may contain an ether bond, and letter a is equal to 0 or 1, such that the molar ratio of alkoxy radical in component (B) to silanol radical in component (A) may be at least 1, to thereby form an organopolysiloxane terminated with an aminoalkyl radical of the formula (3):

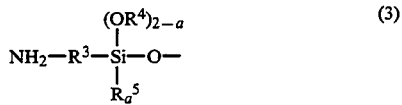

wherein $R^3$, $R^4$, and $R^5$ and a are defined above and a hydrolyzable alkoxy radical;

reacting the organopolysiloxane terminated with an aminoalkyl radical with (C) a compound of the formula (4):

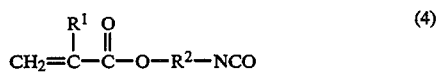

wherein $R^1$ is a hydrogen atom or a substituted or unsubstituted monovalent hydrocarbon radical, and $R^2$ is a substituted or unsubstituted divalent hydrocarbon radical which may contain a NH bond or ether bond, such that the molar ratio of amino radical in the radical of formula (3) to NCO radical in component (C)

may be at least 0.9, to thereby form an organopolysiloxane terminated with a radical of the formula (1):

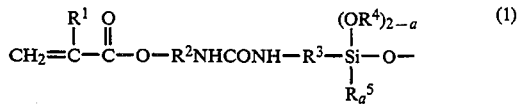

wherein $R^1$, $R^2$, $R^3$, $R^4$, $R^5$, and a are defined above; and mixing said organopolysiloxane terminated with a radical of formula (1) with a photo-polymerization initiator and a curing catalyst.

13. The method for preparing a UV and moisture-curable organopolysiloxane composition according to claim 12, wherein said organopolysiloxane terminated with a silanol radical is of the formula (5)

wherein $R^6$ and $R^7$ are independently substituted or unsubstituted monovalent hydrocarbon radicals having 1 to 8 carbon atoms, and letter m is an integer of at least 5.

14. The method for preparing a UV and moisture-curable organopolysiloxane composition according to claim 13, wherein each of $R^6$ and $R^7$ is selected from the group consisting of lower alkyl radical, alkenyl radical and aryl radical, wherein some or all of the hydrogen atoms attached to the carbon atoms may be replaced by halogen atoms or cyano radicals, and letter m is an integer from 10 to 1000.

15. The method for preparing a UV and moisture-curable organopolysiloxane composition according to claim 12, wherein said aminoalkylalkoxysilane is selected from the group consisting of $NH_2CH_2Si(OMe)_3$, $NH_2C_3H_6Si(OMe)_3$, $NH_2C_2H_4NHC_3H_6Si(OMe)_3$, $NH_2C_2H_4NHCH_2C_6H_4Si(OMe)_3$, $NH_2C_2H_4OC_3H_6Si(OMe)_3$, $NH_2CH_2SiMe(OMe)_3$, $NH_2C_3H_6SiMe(OMe)_2$, $NH_2C_2H_4NHC_3H_6SiMe(OMe)_2$, $NH_2C_2H_4NHCH_2C_6H_4SiMe(OMe)_2$, and $NH_2C_2H_4OC_3H_6SiMe(OMe)_2$, wherein Me is a methyl group.

16. The method for preparing a UV and moisture-curable organopolysiloxane composition according to claim 12, wherein the molar ratio of alkoxy radical in component (B) to silanol radical in component (A) is from 1.5 to 10.

17. The method for preparing a UV and moisture-curable organopolysiloxane composition according to claim 12, wherein the molar ratio of alkoxy radical in component (B) to silanol radical in component (A) is from 2 to 4.

18. The method for preparing a UV and moisture-curable organopolysiloxane composition according to claim 12, wherein said compound of formula (4) is an acrylic compound having an isocyanato radical or a methacrylic compound having an isocyanato radical.

19. The method for preparing a UV and moisture-curable organopolysiloxane composition according to claim 12, wherein the molar ratio of amino radical in the radical of formula (3) to NCO radical in component (C) is from 0.95 to 1.05.

* * * * *